US006489892B2

United States Patent
Lawandy (10) Patent No.: US 6,489,892 B2
(45) Date of Patent: Dec. 3, 2002

(54) USE OF EVAPORATIVELY ACTIVATED COLOR CHANGE FOR VERIFYING THE INTEGRITY OF AN OBJECT, SUCH AS A DATA STORAGE MEDIUM OR A GAMING TOKEN

(75) Inventor: Nabil M. Lawandy, North Kingston, RI (US)

(73) Assignee: Spectra Systems Corporation, Providence, RI (US)

( * ) Notice: Subject to any disclaimer, the term of this patent is extended or adjusted under 35 U.S.C. 154(b) by 0 days.

(21) Appl. No.: 09/860,291

(22) Filed: May 18, 2001

(65) Prior Publication Data

US 2002/0021217 A1 Feb. 21, 2002

Related U.S. Application Data

(60) Provisional application No. 60/205,277, filed on May 18, 2000.

(51) Int. Cl.[7] .............................................. G08B 13/14
(52) U.S. Cl. ................................ 340/572.3; 340/572.1; 369/275.1; 524/360
(58) Field of Search ............................ 340/571, 572.1, 340/572.3, 815.65; 524/360; 427/243, 331, 336; 525/106, 109; 514/291, 253.04; 53/492; 430/270.1, 270.15, 200; 369/275.1, 275.2, 286

(56) References Cited

U.S. PATENT DOCUMENTS

| | | | |
|---|---|---|---|
| 3,804,855 A | 4/1974 | Farber | 260/326.14 |
| 4,120,445 A | 10/1978 | Carrier et al. | 229/53 |
| 4,254,971 A | 3/1981 | Isaac | 282/27.5 |
| 4,662,651 A | 5/1987 | Mowry, Jr. | 283/70 |
| 4,726,608 A | 2/1988 | Walton | 283/96 |
| 4,940,689 A * | 7/1990 | Ito | 503/202 |
| 4,957,352 A * | 9/1990 | Yasuda et al. | 350/353 |
| 4,994,314 A * | 2/1991 | Rosenfeld et al. | 428/36.92 |
| 5,135,262 A * | 8/1992 | Smith et al. | 283/94 |
| 5,457,054 A * | 10/1995 | Geisinger et al. | 436/92 |
| 5,510,163 A | 4/1996 | Sullivan et al. | |
| 5,815,484 A | 9/1998 | Smith et al. | 369/275.1 |
| 5,916,943 A * | 6/1999 | Heller et al. | 524/360 |
| 6,047,964 A | 4/2000 | Lawandy et al. | 273/138.1 |
| 6,312,760 B1 * | 11/2001 | Wheeler | 427/243 |
| 6,338,933 B1 * | 1/2002 | Lawandy et al. | 430/270.1 |
| 6,343,063 B1 | 1/2002 | Rollhaus et al. | 369/286 |

FOREIGN PATENT DOCUMENTS

WO    WO-01/29828 A1    4/2001

* cited by examiner

*Primary Examiner*—Van Trieu
(74) *Attorney, Agent, or Firm*—Harrington & Smith, LLP (57) ABSTRACT

A method and apparatus for verifying the integrity of an object includes providing an authentic object with a layer that includes a volatile component and at least one other component, packaging the object so as to prevent a loss of the volatile component, opening the packaging causing the removal of at least some of the volatile component, and causing a color change with the remaining component for providing a visual indicator of the integrity of the object. A barrier layer may be provided to control the removal of the volatile component, and at least one chromophore may be provided to bias the first layer so as to reduce an amount of time required before the color change is detectable. The object may be gaming token, and the visual indicator may provide information related to the use of the gaming token.

44 Claims, 5 Drawing Sheets

USE OF EVAPORATIVELY ACTIVATED COLOR CHANGE FOR VERIFYING THE INTEGRITY OF AN OBJECT, SUCH AS A DATA STORAGE MEDIUM OR A GAMING TOKEN

CLAIM OF PRIORITY

This patent application claims priority under 35 U.S.C. §119(e) from co-pending U.S. Provisional Patent Application 60/205,277, filed May, 18, 2000.

FIELD OF THE INVENTION

These teachings relate to providing authentication of objects and evidence of tampering with a package containing an object.

BACKGROUND OF THE INVENTION

It is well known that certain items, for example CD-ROMS and DVDs, are susceptible to unauthorized copying. With currently available equipment it is possible to make copies of these and other objects that are indiscernible from those produced by the original manufacturer. It is also possible to open certain products, use them and then to return them to their packaging, or reseal them such that such unauthorized use is undetectable.

It would be desirable when distributing an object to provide a mechanism for verifying the integrity of the object. For the purposes of these teachings, integrity is defined as including the authenticity of the object andlor an indication that packaging for the object has not been opened prior to being opened by an authorized user, such as a purchaser of the object.

For example, a company that sells computer software will find it advantageous to provide to the purchaser an indication that the company itself has manufactured the computer software media as opposed to a counterfeiter. In addition, that same company would also find it advantageous to provide an indication to the purchaser that the packaging of the software has not been opened.

OBJECTS OF THE INVENTION

It is a first object and advantage of these teachings to provide a system and process for verifying the integrity of an object.

It is another object and advantage of these teachings to verify the integrity of an object utilizing an evaporative technique to manifest a detectable indicator of integrity.

SUMMARY OF THE INVENTION

A method and apparatus for verifying the integrity of an object includes providing an authentic object with a layer that includes a volatile component and at least one other component, packaging the object so as to prevent a loss of the volatile component, opening the packaging causing the removal of at least some of the volatile component, and causing a color change with the remaining component for providing a visual indicator of the integrity of the object. A barrier layer may be provided to control the removal of the volatile component, and at least one chromophore may be provided to bias the first layer so as to reduce an amount of time required before the color change is detectable.

The object may be gaming token, and the visual indicator may provide information related to the use of the gaming token, as well as the authenticity of the gaming token.

BRIEF DESCRIPTION OF THE DRAWINGS

The above set forth and other features of these teachings are made more apparent in the ensuing Detailed Description of the Invention when read in conjunction with the attached Drawings, wherein:

FIGS. 1C and 1D shows as an optically encoded medium such as a DVD or CD-ROM that incorporates one or more aspects of the teachings found herein;

DETAILED DESCRIPTION OF THE INVENTION

Although the teachings found herein will be described with reference to the embodiments shown in the drawings, it should be understood that these teachings may be embodied in many forms of alternative embodiments. In addition, any suitable size, shape or type of materials or elements could be used.

Figure 1A:
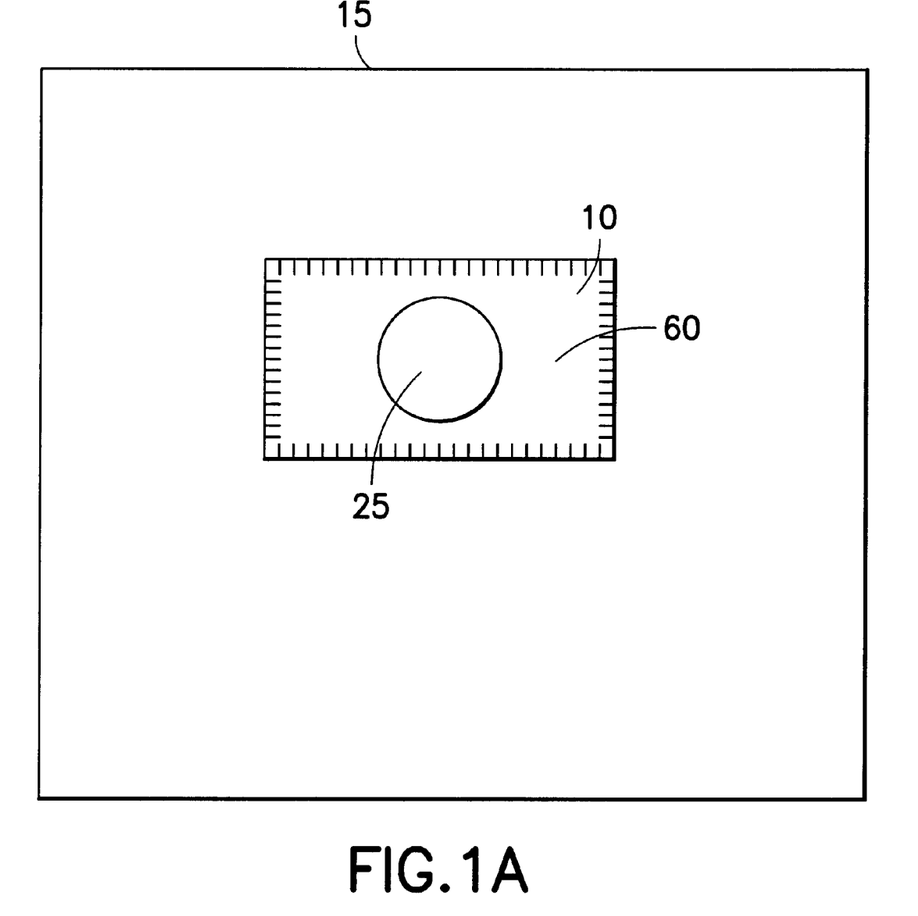
FIG. 1A shows an object that incorporates one or more aspects of the teachings found herein.

FIG. 1A shows an object 10 that is enclosed within a package 15. The object 10 is coated or printed with a coating 25. The coating 25 may be transparent (e.g., a clear coating) or it may have a predetermined coloration. Upon opening the package 15, the coating 25 changes to a particular color, providing an indication of the integrity of the object.

Figure 1B:
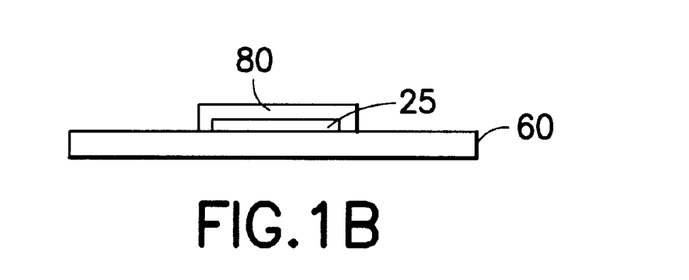
FIG. 1B shows a cross sectional view of the object.

FIG. 1B shows a cross sectional view of the object 10, including a substrate 60, the coating 25, and an optional barrier or protective layer 80.

The coating 25, when it changes color, may create a graphical image and/or text, for example, a company logo, a product trademark, a copyright notice, a watermark, etc. that serves to provide additional authentication of the object 10 and/or a source or manufacturer of the object 10.

Furthermore, the appearance of this image over time (minutes or seconds) may provide an entertainment of novelty effect that can be tied to promotional purposes. For example, after opening the packaging 15, a specific image could appear, indicating that the user may be entitled to purchase another product at a discount. Other information could also be presented, such as information descriptive of a use of the object 10, or instruction s for installing the object 10 or for installing data recorded on the object 10, in the case where the object 10 is a data sotrage medium.

The object 10 may include any object or product that is capable of being packaged, for example, an integrated circuit, a printer cartridge, and, as mentioned above, a CD-ROM, or a DVD.

In the example above, the object 10 is constructed so as to include a layer or coating 25 of a reactive compound. FIG. 1C shows the object 10, which in this example is embodied as an optically encoded medium, such as a DVD or CD-ROM, or any other medium suitable for conveying information and for supporting coating 25. The medium includes the substrate 60 and the coating 25 applied to or over the substrate 60. The medium is shown within a closed or sealed package 30. As shown in FIG. 1D, upon opening the package 30, the coating 25 undergoes a color change that is manifested as a graphical image of a company logo 35, and in this example, text 40 identifying the particular product and/or the manufacturer or supplier of the product. In one example of the utility of these teachings, a code appears after some time that is required to register the product for use.

In one embodiment the coating 25 includes a dye, such as a lactone dye, having a cation with strong light absorbance properties in the visible range. A polymer material or some other material can be used to provide an acidic pH state for causing a controlled ring opening of the lactone dye, and which can be cross-linked or otherwise modified to form a relatively inert or inactive coating layer.

Lactone dyes are generally colorless so long as the lactone moiety remains intact. However, by modifying a state or condition of the moiety, for example by lowering the pH and/or by changing the micropolarity, the lactone ring is cleaved and the intensely colored cationic form of the dye is obtained.

Figure 2:
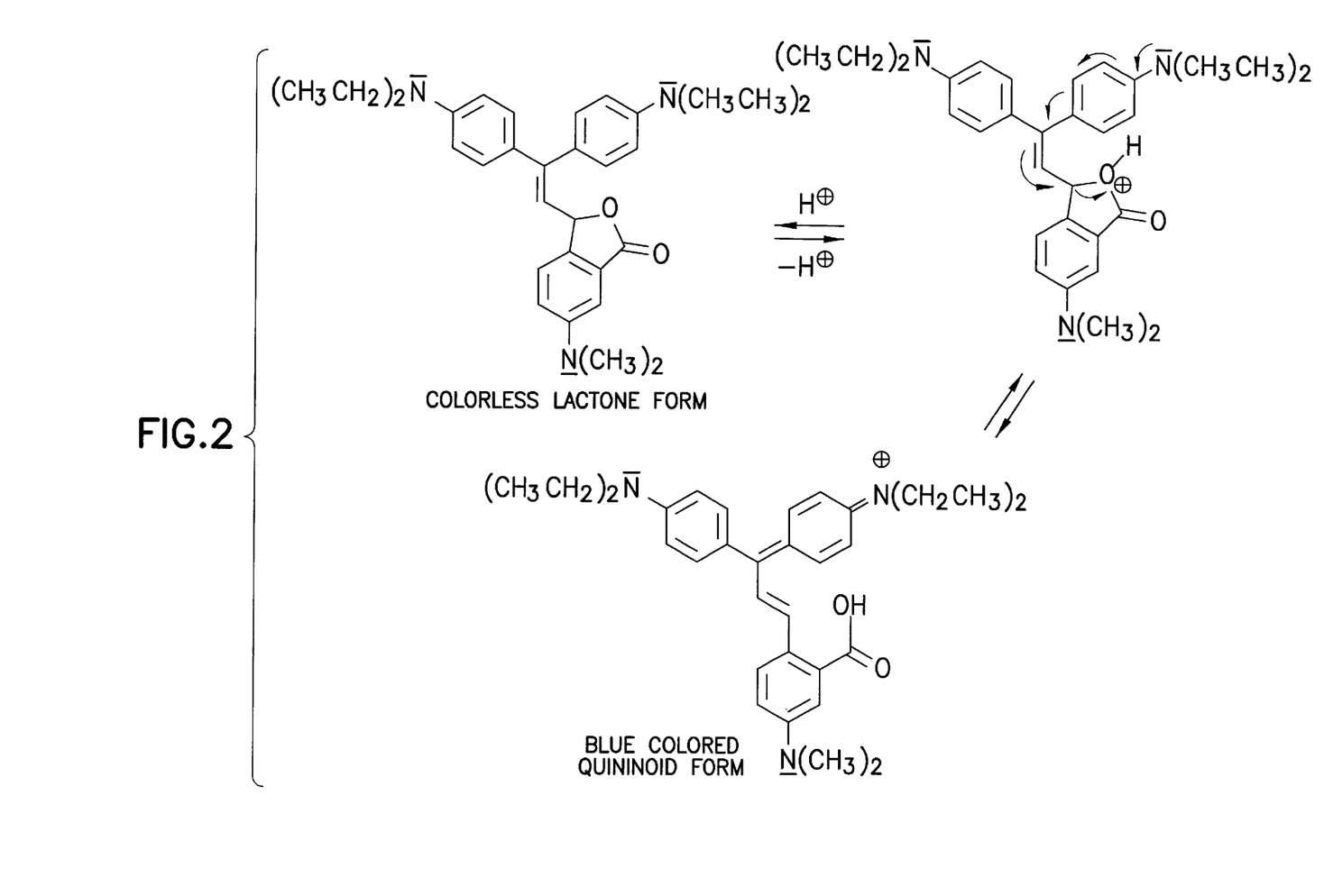
FIG. 2, illustrates a colorless lactone form and its cationic (colored) form, and is useful in explaining an embodiment of these teachings that employ an evaporative technique for manifesting a color change.

Referring to FIG. 2, an example of the coating 25 includes at least three components: (1) a dye, such as a lactone type dye; (2) acidic sites; and (3) a solvent, such as an amine or amide-based solvent. The acidic sites may be provided by a polymer, a clay, or by any other acidic substrate. When the components are combined, the amine or amide-based solvent serves to stabilize the lactone dye to the colorless form. When the amide or amine-based solvent evaporates, the lactone group reacts with the acidic sites and undergoes a ring opening to generate a highly colored substance with a strong absorption at about 650 nm.

In greater detail, the colorless lactone shown in the reaction scheme shown in FIG. 2 is protonated by an acid. Each nitrogen is shown with its free electron pair. The protonated lactone undergoes a ring opening to produce the colored compound, in this case, blue, which is in a quininoid form. The electron pairs on the two nitrogens with the ethyl groups are directly involved with the ring opening of the protonated lactone, thereby producing the colored compound in a quininoid form.

The functioning of this color changing system is based on a four component equilibrium. The equilibrium is between the colorless lactone form, the colored quininoid form, and the number of acidic and basic sites associated with the permanent and the volatile components of the color changing system.

In general, the rate of color change is dependent on the type of solvent and its boiling point. By selecting an appropriate solvent, complete color formation can occur within a range of a few minutes to several hours, and may be further adjusted to occur within shorter or longer time periods. Moreover, the final maximum absorbance at a particular wavelength can be modified over a range of absorbances by changing the lactone moiety to acidic site ratio.

In other embodiments of these teachings, the polymer provides a basic pH state while the evaporating solvent has an acidic nature. In this case the color change occurs when the system transitions from acidic to basic due to evaporation.

The "undyed" state of the object 10 may be maintained by storing the object 10 in a way that prevents the solvent from evaporating, described in further detail below.

Figure 3:
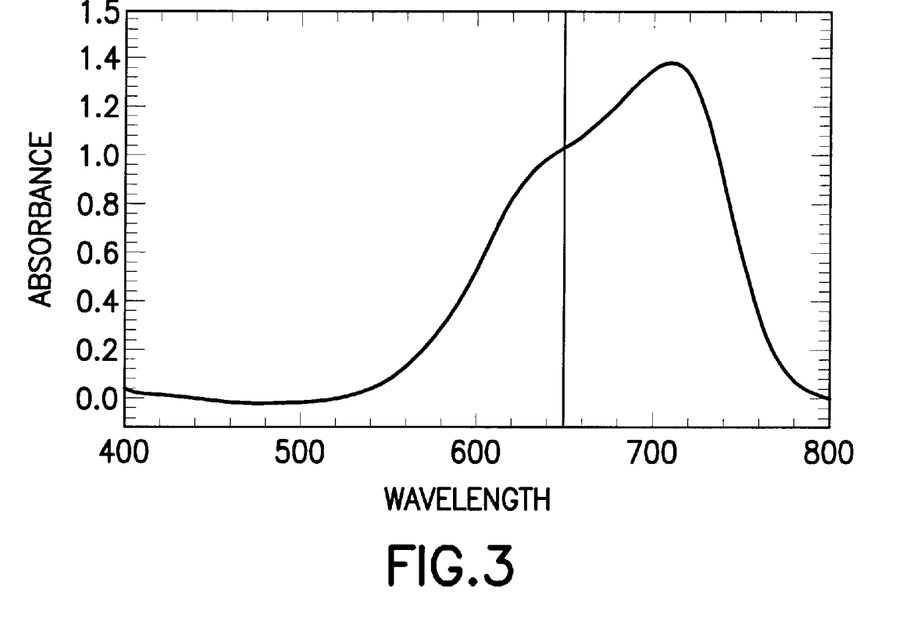
FIG. 3 is a graph that illustrates a change in optical absorption as a function of wavelength for an embodiment of a color changing compound (an amino-phthalide dye (SD-3055) in a 4-vinylphenol polymer) in accordance with an aspect of these teachings.

Further in accordance with an embodiment of these teachings an amino-phthalide dye in a 4-vinylphenol polymer (av. MW 8,000) was cross-linked in the presence of formaldehyde. FIG. 3 shows the optical absorbance of this system when coated on a glass plate, and exposed to normal room conditions for 21 hours. The vertical bar represents the absorbance at 650 nm. In other embodiments the crosslinking may be controlled in incremental steps, as the level of cross-linking was found to effect the lactone ring opening. It may further be desirable to employ a phenolformaldehyde resin system with the formaldehyde functionality already chemically linked to the polymer, in order to avoid the use of free formaldehyde. Analogues may also be synthesized with solubility properties tailored to the polymer formulations.

In any of these embodiments the coating 25 may be applied by a spin coating procedure. As an example, for the amino-phthalide dye in the 4-vinylphenol polymer embodiment a layer thickness equal to or less than about one micrometer was found to be optimum.

EXAMPLE 1

A solution was prepared of 1 g poly(4-vinylphenol) (MW=8,000) in 10 ml ethanol, 2 ml N,N-dimethylformamide and 200 mg of 3-[2,2-bis(4-diethylaminophenyl)vinyl)-6-dimethylaminophthalide. Glass slides, DVD and CD disks were coated with this formulation to produce a 500–700 nm thick layer. The coating was dried at 60–70 degrees C. for a few minutes, which caused the generation of an intensely blue colored dye. This blue dye was transformed back to its colorless state by exposing the slides or disks to a controlled atmosphere of an amine or amide based solvent (e.g., foaminess, acetamides, pyrrolidinones). The colorless state was maintained when these slides and disks remained sealed in polyester or polypropylene bags along with an absorbent medium, such as filter paper, that contained a few drops of the corresponding solvent. Upon removal from the bag, color formation occurred again. Depending on the boiling point of the used solvent, the color formation could be timed. For example, with the formulation described in this example, and by using 1-methyl-2-pyrrolidinone as a solvent, a maximum absorbance of 0.7 at 650 nm was achieved after about six hours at room temperature.

EXAMPLE 2

Modification of the polymer to lactone ratio was found to control the maximum achievable absorbance at a particular wavelength, in this example, 650 nm. It is important not to just increase the concentration of lactone groups, but to also adjust the number of acidic sites available to the lactone moiety. When glass slides and disks were coated with a formulation of 1.5 g poly(4-vinylphenol) (MW=8,000), 10 ml ethanol, 2 ml N,N-dimethylformamide and 300 mg of 3-[2,2-bis(4-diethylaminophenyl)vinyl)-6-dimethylaminophthalide, a maximum absorbance of 1.7 at 650 nm was obtained after about six hours at room temperature.

EXAMPLE 3

If high boiling amine or amide-based solvents are used; e g., b.p.>100° C., the solvent can be added directly to the formulation and exposure of the coating to a controlled solvent atmosphere can be omitted. For example, when slides or disks were coated with a formulation of 1 g poly(4-vinylphenol) (MW=8000), 10 ml ethanol, 2 ml 1-methyl-2-pyrrolidinone and 200 mg of 3-[2,2-bis(4-diethylaminophenyl)vinyl]-6-dimethylaminophthalide, and then dried for 5 minutes at 50° C., a slightly tacky colorless layer was obtained. The color change to blue occurred at the same rate and to the same level of absorbance as described in Example 1 of this embodiment.

Reference in regard to the compounds mentioned above may be had to co-pending U.S. patent application Ser. No. 09/690,405, entitled "Methods and Apparatus for Rendering an Optically Encoded Medium Unreadable," filed Oct. 17, 2000, the disclosure of which is incorporated by reference insofar as it does not conflict with the teachings found herein.

Figure 4:
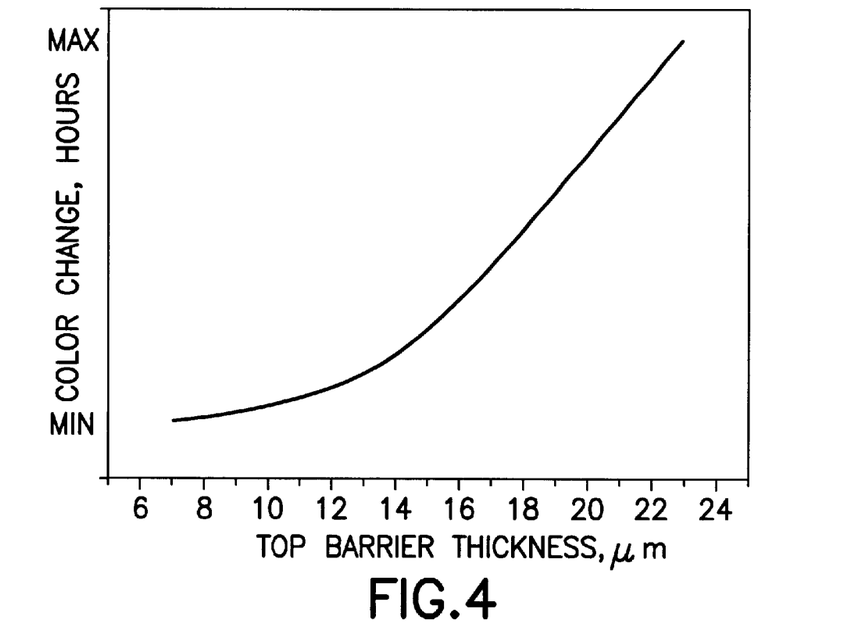
FIG. 4 is a graph that plots the time for a color change versus top barrier layer thickness.

A further aspect of these teachings is a mechanism to control the duration of the color change. Referring to FIG. 4, a graph is depicted that plots the time to effect a color change (in hours) versus a thickness of the overlying barrier layer 80 (see FIG. 1A) that is placed over the coating 25. An increase in the thickness of the barrier layer 80 can be seen to increase the amount of time that the coating requires to make the transition from a transparent to non-transparent state, as transport of the volatile substance (e.g., the evaporating solvent) through the barrier layer 80 is slowed.

Figure 5:
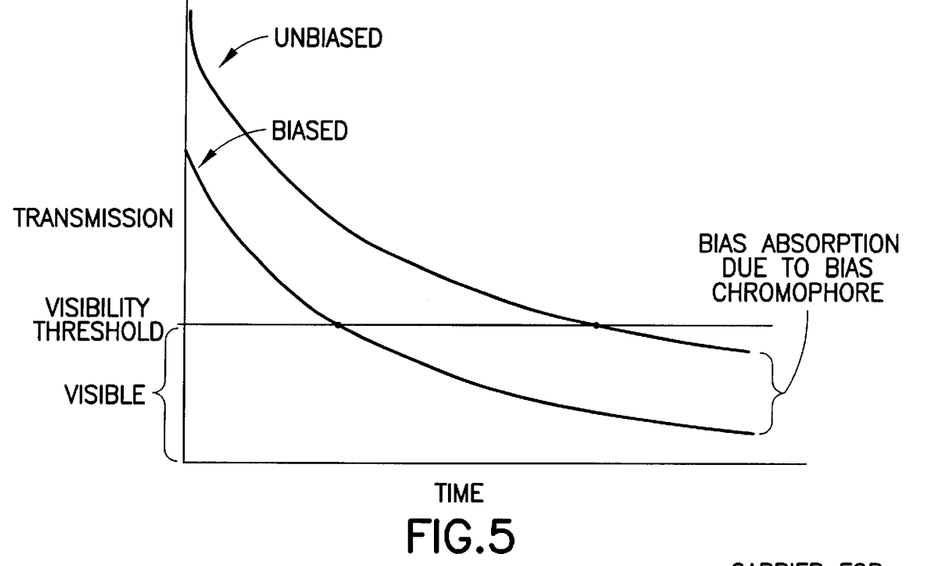
FIG. 5 is a graph that shows the use of a bias chromophore to vary a time required for an integrity indicator layer to reach a visibility threshold.

As a further control over the coating transition time from transparent to non-transparent, and referring also to FIG. 5, the coating 25 can be biased with a chromophore selected to absorb at the desired wavelength, e.g., at about 650 nm. By causing the coating 25 to exhibit some amount of absorption that is less than the amount of absorption that allows the color change to be observed (or "visible," as in a "visibility threshold"), the time required for the color changing coating to become visible may be reduced. The use of the bias chromophore can also be advantageous to insure that the coating 25 will not asymptotically approach a visibility threshold, without actually crossing it.

One suitable biasing chromophore for the substrate 60 is a dye known as 3-Diethylyamino-7-diethyliminophenoxazonium perchlorate, or Oxazine 725, which has an absorbance maximum at 646 nm in ethanol.

Preferably, the visibility of the coating 25 increases due to the coating 25 turning non-transparent, opaque, or substantially opaque, until it becomes visible.

In this regard it should be noted that it is not necessary in this embodiment, or in any of the other embodiments of these teachings that employ the coating 25, for the coating 25 to be become optically opaque, as the color forming coating may become visible well before a state or condition of optical opacity is reached.

In order to prevent a premature loss of material by evaporation, the barrier layer 80 can be affixed to a surface of the product on which the coating 25 has been applied. In one example, the barrier layer 80 is one that is impenetrable to the volatile component or components that are placed on the substrate 60 (such as the above mentioned solvents in the evaporation embodiments). The barrier layer 80 serves to inhibit transport, such as by evaporation, until removed prior to use of the product utilizing the substrate. In one example, the barrier layer 80 is in the form of a peel off sheet.

Removal of the peel-off sheet barrier layer 80 after opening the packaging of the object serves to initiate the color changing process that eventually renders the graphic information or text visible on the substrate 60.

In one embodiment the barrier layer 80 also serves as a protective layer. In this embodiment the protective layer may include a UV-curable polymer that is applied by a spin-coating or other procedure and then UV-cured to harden it. The protective layer polymer material preferably comprises a silicone-based material. It may also comprise epoxy-based constituent(s). The barrier layer 80, as well as the coating 25, can be applied to the substrate 60 by a spraying technique, as well as by spinning-on, or by placing the substrate 60 into an atmosphere that is saturated with the desired constituents, and letting the desired constituents condense onto the substrate 60, preferably through a mask or using some other patterning technique so as to provide the desired graphical image and/or text.

Figure 6:
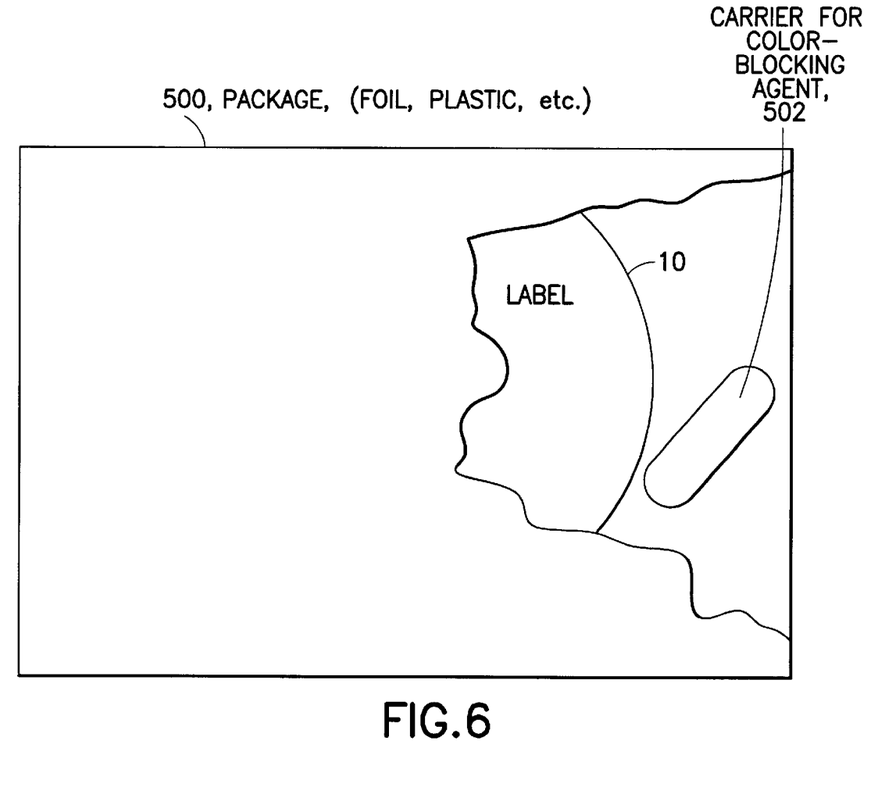
FIG. 6 is a partially cut-away view of a package containing an object having a mechanism for verifying the integrity of the object.

FIG. 6 illustrates a sealed container or package 500, such as a foil or a plastic bag, that is suitable for practicing an aspect of the teachings found herein. The package 500 contains one or more of the objects 10, and a carrier or source 502 of a color blocking agent (CBA). The carrier 502 retains the CBA and gradually releases it into the package 500 in the gaseous state. The CBA is delivered to the object 10 by means of diffusive transport, where it interacts with the coating 25 to maintain the coating in its transparent or predetermined colored state. This process continues until equilibrium is achieved between the CBA gas and the coating 25, from which point the coating 25 remains in its transparent or predetermined colored state until the package 500 is opened.

The CBA may be a solid, a liquid or a gas. Examples of release mechanisms include evaporation and diffusion through a membrane. The carrier 502 of the CBA can be implemented as a patch or swab of material with a developed surface (e.g., fibrous or porous), or a CBA-absorbing material, such as a polymer. The CBA release kinetics can be adjusted through various parameters of the carrier 502, such as size and position in the package 500 relative to the object 10, and/or through porosity or permeability. The CBA could be the same solvent that forms a part of the coating 25.

Opening of the package 500 results in rapid loss of the CBA from the package, as well as depletion of the CBA carrier 502. The equilibrium between the CBA gas and coating 25 is then permanently shifted towards decreasing CBA concentration, which corresponds to the time remaining before the graphical information or text becomes visible. Thus, opening the package triggers the color changing process that eventually renders the graphical information or text visible on the object 10.

In various embodiments of these teachings the material that comprises the coating 25 can include a lactone dye, such as crystal violet lactone, poly-p-(hydroxystyrene), ethanol, N-methyl pyrrolidinone and ammonia and formaldehyde, or the material can comprise cellulose acetate butyrate, ethyl acetate, silica gel, and benzyl alcohol, or the material can comprise a salt of a volatile amine, a non-volatile acid component and a lactone dye or a pH indicator dye, or the material can comprise a water damp polymer film containing a pH indicator dye, wherein during storage the layer is exposed to an atmosphere of a gas whose water solution is one of acidic or basic, and wherein upon removal from storage a volatile gas evaporates from the water damp film, and the pH changes causing a color change in the pH indicator dye.

It can be appreciated that a number of embodiments of these teachings have been described herein, and it should be further appreciated that these teachings are not intended to be read in a limiting sense to encompass only these described embodiments.

It is important to note that the biasing chromophores referred to above can be located in the coating 25, and/or in the barrier layer 80, and/or in a third layer.

It is also important to note that the color change described herein may not necessarily be visually detectable under normal light conditions. For example, the color change, and an associated graphical image and/or text, may be visually detectable only under certain illumination conditions, such as when viewed using ultra-violet illumination.

There are other applications that may benefit from the teachings described herein. For example, a gaming application may employ these teachings to advantage. Further in this regard, certain lottery games are played by scratching a latex layer off of a ticket to reveal printed information underneath, or by drawing numbers and matching them to numbers printed on a slip of paper. Utilizing the teachings found herein, a gaming application may be implemented that includes a packaged gaming token. A gaming token may include a paper or cardboard ticket, a plastic or metal chip such as a poker chip or a casino chip, or any substrate suitable for a gaming application and for supporting the coating 25.

Figure 7A:
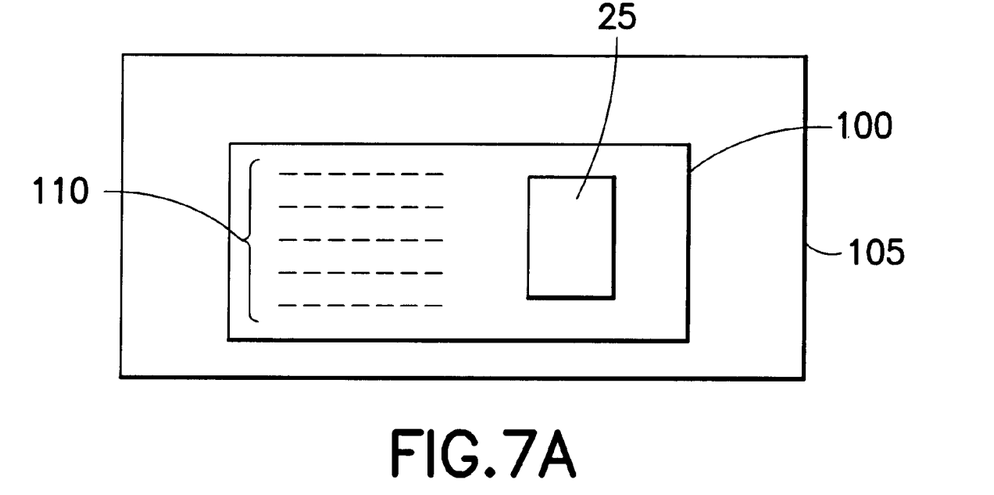
FIGS. 7A, 7B, and 7C show examples of gaming tokens utilizing the teachings described herein.
Figure 7B:
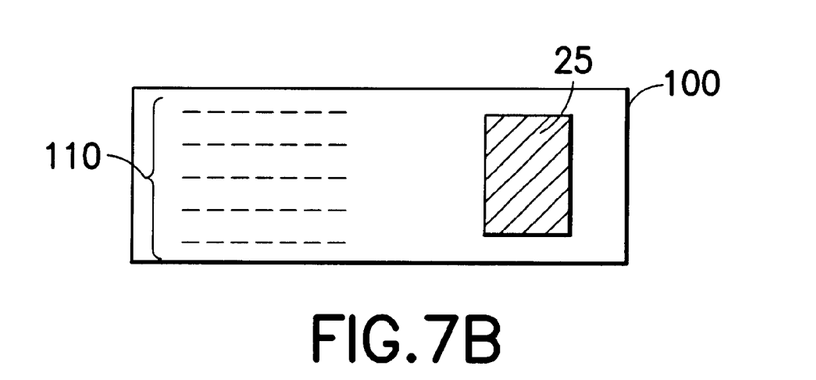

Referring to FIG. 7A, an example of a gaming token 100 is shown enclosed in a package 105. The gaming token includes a gaming area 110, preferably including indicia employed by a user to participate in the gaming application. The gaming area 110 may include a latex layer that obscures underlying indicia, such as symbols or numbers, or it may just contain preprinted numbers or symbols. The gaming token 100 also includes coating 25. As shown in FIG. 7B, upon removal from the package 105, the coating 25 undergoes a change and provides a visual indication that the package 105 has been opened.

Figure 7C:
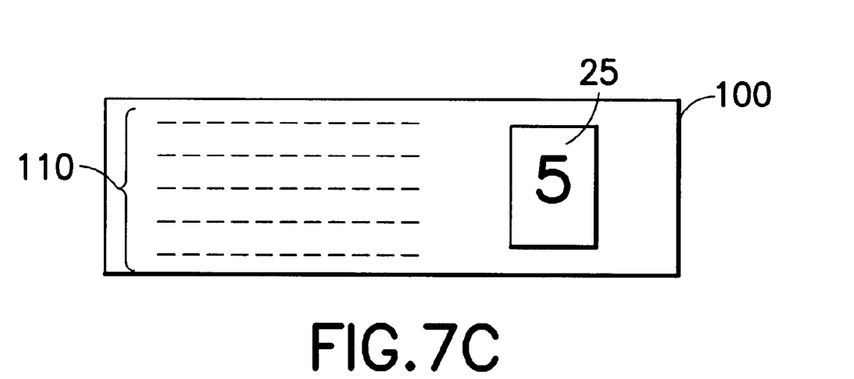

FIG. 7C shows another embodiment of the gaming token 100. Upon being removed from the package 105, the coating 25 provides a visual indication of information related to the gaming area 110 and/or other information related to the gaming token. The information may include a win/lose indication, a winning amount, a winning number, related information such as a prize amount multiplier, or any other indicia related to participating in the gaming application. The visual indication could also provide an indication of the authenticity of the gaming token 100. In addition, the visual indication may also provide indicia required to redeem the gaming token 100, for example, a validation number or a code or a bar code that becomes visible only upon opening the package 105.

Thus, utilizing the teachings found herein, a gaming application may be realized that provides, among other features, an instant winning or losing indication and/or an indication that the package 105 was opened, and/or a visual indication of authenticity, and/or indicia required for redeeming the gaming token 100.

In all of the foregoing examples it can be appreciated that if the color change has not occurred at the time that the packaging is first opened, the user is assured that the package has not been tampered with and opened previously by some unauthorized person.

It should thus be apparent that various alternatives and modifications to the presently preferred embodiments of the teachings found herein may be devised by those skilled in the art without departing from these teachings. Accordingly, the teachings herein are intended to embrace all such alternatives, modifications and variances which fall within the scope of the claims.

What is claimed is:

1. A method for verifying the integrity of an object comprising:
    providing an authentic object with a layer that is comprised of a volatile component and at least one other component;
    packaging said object so as to prevent a loss of said volatile component;
    opening said packaging causing the removal of at least some of said volatile component; and
    causing a color change with the remaining component for providing a visual indication that the package has been opened.

2. A method as in claim 1, wherein said other component is comprised of a lactone dye.

3. A method as in claim 1, wherein the other component is comprised of crystal violet lactone.

4. A method as in claim 1, wherein said layer is comprised of poly-p-(hydroxystyrene), ethanol, crystal violet lactone and N-methyl pyrrolidinone.

5. A method as in claim 1, wherein said layer is comprised of poly-p-(hydroxystyrene), ethanol, crystal violet lactone, ammonia, N-methyl pyrrolidinone, and formaldehyde.

6. A method as in claim 1, wherein said layer is comprised of cellulose acetate butyrate, ethyl acetate, silica gel, and benzyl alcohol.

7. A method as in claim 1, wherein said layer is comprised of a salt of a volatile amine, a non-volatile acid component and a lactone dye.

8. A method as in claim 1, wherein said layer is comprised of a salt of a volatile amine, a non-volatile acid component and a pH indicator dye.

9. A method as in claim 1, wherein said layer is comprised of a water damp polymer film containing a pH indicator dye, wherein during storage said layer is exposed to an atmosphere of a gas whose water solution is one of acidic or basic, and wherein upon removal from storage a volatile gas evaporates from the water damp film, and the pH changes causing a color change in the pH indicator dye.

10. A method as in claim 1, and further comprising providing a barrier layer over said layer to control at least a rate of removal of said volatile component.

11. A method as in claim 1, further comprising providing at least one chromophore that biases said layer so as to reduce an amount of time required before said color change is detectable.

12. A method as in claim 1, wherein said object comprises a gaming token.

13. A gaming method comprising:
    providing a gaming token having a layer comprising a volatile component and at least one other component;
    packaging said gaming token to prevent a loss of said volatile component;
    opening said packaging causing the removal of at least some of said volatile component; and
    causing a color change with the remaining component for providing a visual indicator of information related to said gaming token.

14. The method of claim 13, wherein said information comprises a winning amount.

15. The method of claim 13, wherein said information comprises a visual indication that said packaging was opened.

16. The method of claim 13, wherein said information comprises a visual indication of authenticity.

17. The method of claim 13, wherein said information comprises indicia required for redeeming said gaming token.

18. An object assemblage comprising:
   an object having a region comprised of a layer containing a volatile component and at least one other component; and
   packaging enclosing said object, wherein opening said packaging causes the removal of at least some of said volatile component causing a color change with the remaining component for providing a visual indication that the packaging has been opened.

19. An object assemblage as in claim 18, wherein said other component is comprised of a lactone dye.

20. An object assemblage as in claim 18, wherein said other component is comprised of crystal violet lactone.

21. An object assemblage as in claim 18, wherein said layer is comprised of poly-p-(hydroxystyrene), ethanol, crystal violet lactone and N-methyl pyrrolidinone.

22. An object assemblage as in claim 18, wherein said layer is comprised of poly-p-(hydroxystyrene), ethanol, crystal violet lactone, ammonia, N-methyl pyrrolidinone, and formaldehyde.

23. An object assemblage as in claim 18, wherein said layer is comprised of cellulose acetate butyrate, ethyl acetate, silica gel, and benzyl alcohol.

24. An object assemblage as in claim 18, wherein said layer is comprised of a salt of a volatile amine, a non-volatile acid component and a lactone dye.

25. An object assemblage as in claim 18, wherein said layer is comprised of a salt of a volatile amine, a non-volatile acid component and a pH indicator dye.

26. An object assemblage as in claim 18, wherein said layer is comprised of a water damp polymer film containing a pH indicator dye, wherein when packaged said layer is exposed to an atmosphere of a gas whose water solution is one of acidic or basic, and wherein upon removal from said package a volatile gas evaporates from the water damp film, and the pH changes causing a color change in the pH indicator dye.

27. An object assemblage as in claim 18, further comprising a barrier layer over said layer to control at least a rate of removal of said volatile component.

28. An object assemblage as in claim 18, wherein said layer comprises at least one chromophore that biases said layer so as to reduce an amount of time required before said color change is detectable.

29. A gaming token assemblage comprising:
   a gaming token having a layer comprised of a volatile component and at least one other component; and
   a package enclosing said gaming token to prevent a loss of said volatile component, wherein opening said package causes the removal of at least some of said volatile component causing a color change with the remaining component for providing a visual indicator of information related to a use of said gaming token.

30. The gaming token assemblage of claim 29, wherein said information comprises information for determining whether said gaming token is a winning gaming token.

31. The gaming token assemblage of claim 29, wherein said information comprises a visual indication that said packaging was opened.

32. The gaming token assemblage of claim 29, wherein said information comprises a visual indication of the authenticity of said gaming token.

33. The gaming token assemblage of claim 29, wherein said information comprises indicia required for redeeming said gaming token.

34. A data storage medium assemblage comprising:
   a data storage medium having a layer comprised of a volatile component and at least one other component; and
   a package enclosing said data storage medium to prevent a loss of said volatile component, wherein opening said package causes the removal of at least some of said volatile component causing a color change with the remaining component for providing a visual indicator of information related to said data storage medium.

35. The data storage medium assemblage of claim 34, wherein said information comprises indicia that is descriptive of a manufacturer of said data storage medium.

36. The data storage medium assemblage of claim 34, wherein said information comprises indicia that is descriptive of the authenticity of said data storage medium.

37. An article of manufacture comprising a region comprised of a volatile component and at least one other component, said region being responsive to the removal of at least some of said volatile component to the environment for causing a color change with the remaining component, said region being patterned such that the color change provides visually perceptible information to a viewer of the region.

38. An article of manufacture as in claim 37, where the visually perceptible information comprises an indication that said article of manufacture was removed from a package that sealed the article of manufacture away from the environment.

39. An article of manufacture as in claim 37, where the visually perceptible information comprises an indication of a source of said article of manufacture.

40. An article of manufacture as in claim 37, where the visually perceptible information comprises an indication of a manufacturer of said article of manufacture.

41. An article of manufacture as in claim 37, where the visually perceptible information comprises an indication of the authenticity of said article of manufacture.

42. An article of manufacture as in claim 37, where the visually perceptible information comprises an indication of usage instructions for said article of manufacture.

43. An article of manufacture as in claim 37, where the visually perceptible information comprises an indication of installation instructions for said article of manufacture.

44. An article of manufacture as in claim 37, where said article of manufacturer comprises a gaming token, and where the visually perceptible information comprises an indication of at least one of a value of the gaming token and information related to redeeming the gaming token.

* * * * *